(12) United States Patent
Thiagarajan et al.

(10) Patent No.: US 10,855,596 B2
(45) Date of Patent: Dec. 1, 2020

(54) LOAD BALANCING AMONG MULTIPLE ENDPOINT COMPUTING SYSTEMS OF A DOMAIN

(71) Applicant: Microsoft Technology Licensing, LLC, Redmond, WA (US)

(72) Inventors: Prabu Raj Thiagarajan, Redmond, WA (US); Debarghya Mandal, Woodinville, WA (US); Mehmet Tatlicioglu, Kirkland, WA (US); Allen Brice Callaway, Bellevue, WA (US); Hrishikesh D. Kulkarni, Seattle, WA (US); Dilip Kurian Lukose, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 16/197,069

(22) Filed: Nov. 20, 2018

(65) Prior Publication Data

US 2020/0162385 A1 May 21, 2020

(51) Int. Cl.
*H04L 12/803* (2013.01)
*H04L 12/26* (2006.01)
*H04L 12/733* (2013.01)
*H04L 12/707* (2013.01)
*H04L 12/741* (2013.01)
*H04L 29/12* (2006.01)

(52) U.S. Cl.
CPC ........ *H04L 47/125* (2013.01); *H04L 43/0876* (2013.01); *H04L 45/126* (2013.01); *H04L 45/22* (2013.01); *H04L 45/24* (2013.01); *H04L 45/74* (2013.01); *H04L 61/1511* (2013.01)

(58) Field of Classification Search
CPC . H04L 47/125; H04L 43/0876; H04L 45/126; H04L 45/22; H04L 45/24; H04L 45/74; H04L 61/1511
See application file for complete search history.

(56) References Cited

U.S. PATENT DOCUMENTS

| | | |
|---|---|---|
| 6,119,143 A | 9/2000 | Dias et al. |
| 2003/0065762 A1 | 4/2003 | Stolorz et al. |
| 2007/0250631 A1 | 10/2007 | Bali et al. |

(Continued)

OTHER PUBLICATIONS

Akamai Developer, "Global Traffic Management Load Feedback API v1," https://developer.akamai.com/api/web_performance/global_traffic_management_load_feedback/v1.html, retrieved Oct. 29, 2018, 10 pages.

(Continued)

*Primary Examiner* — Melvin C Marcelo
(74) *Attorney, Agent, or Firm* — Holzer Patel Drennan

(57) ABSTRACT

A method for load balancing among multiple endpoint computing systems of a domain includes receiving a request to access the domain; identifying a target endpoint from the multiple endpoint computing systems based on routing logic for the domain; obtaining a load metric for the target endpoint; determining whether the load metric for the target endpoint satisfies an overload condition; and redirecting a fractional portion of traffic of the domain away from the target endpoint and to an alternate endpoint of the multiple endpoint computing systems in response to determining that the load metric for the target endpoint satisfies the overload condition.

25 Claims, 6 Drawing Sheets

(56) References Cited

U.S. PATENT DOCUMENTS

| | | | |
|---|---|---|---|
| 2016/0094645 A1* | 3/2016 | Ashutosh | H04L 61/103 709/226 |
| 2017/0054683 A1* | 2/2017 | Budhani | H04L 63/04 |
| 2017/0331667 A1 | 11/2017 | Cai | |
| 2017/0353437 A1* | 12/2017 | Ayyadevara | H04L 63/061 |

OTHER PUBLICATIONS

Colajanni, et al., "Scheduling Algorithms for Distributed Web Servers", In Proceedings of the 17th International Conference on Distributed Computing Systems, May 27, 1997, pp. 169-176.

"International Search Report and Written Opinion Issued in PCT Application No. PCT/US2019/061056", dated Feb. 4, 2020, 11 Pages.

* cited by examiner

LOAD BALANCING AMONG MULTIPLE ENDPOINT COMPUTING SYSTEMS OF A DOMAIN

BACKGROUND

A user may request access to data of a domain by initiating a query specifying the domain name (e.g., www-.bing.com). This request is received at a domain name server (DNS), which in turn, resolves the domain name to a corresponding internet protocol (IP) address associated with an endpoint computing system. Some domains are serviced by multiple endpoint computing systems at different locations around the world. For example, the domain "Bing-.com" may be supported by multiple different data centers that are geographically dispersed.

When a single domain is served by multiple geographically-distributed endpoint computing systems, the DNS may be configured to apply routing rules to direct each request to a select one of the endpoint computing systems for servicing. For example, a DNS server implementing geographic fencing rules may receive a domain request from a user in China and selectively direct the request to a version of the domain that is supported by a server located in a Chinese data center rather than another version of the domain that is supported by a server in a European data center.

SUMMARY

Figure 1:
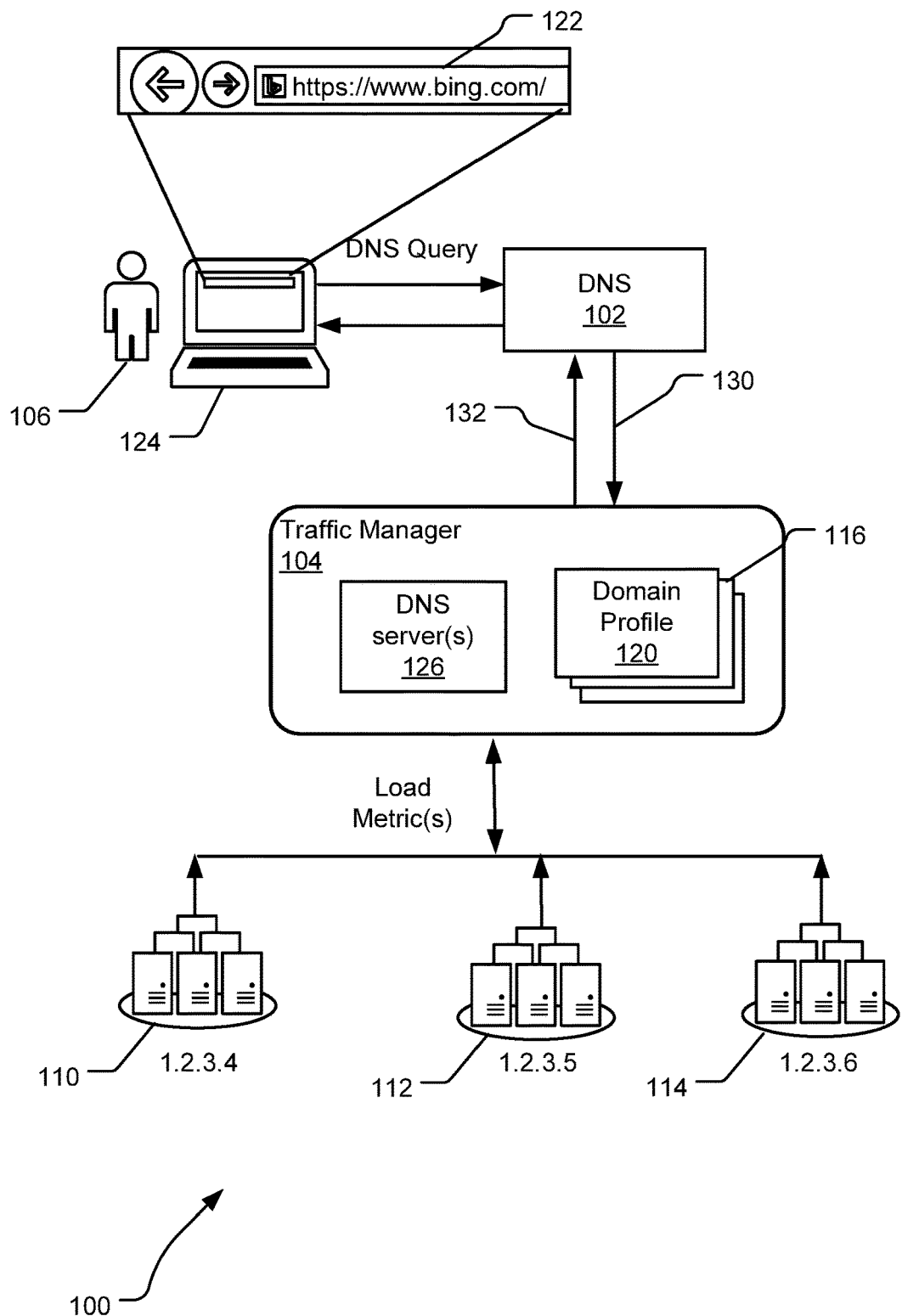
FIG. 1 illustrates an example system with a traffic manager for load balancing among multiple endpoint computing systems servicing a same domain.

A method for load balancing among multiple endpoint computing systems of a domain includes receiving a domain-name server (DNS) request to access the domain and identifying a target endpoint for the DNS request from the multiple endpoint computing systems based on routing logic for the domain. Each of the multiple endpoint computing systems servicing the domain is addressable by a different network address. The method further includes obtaining a load metric for the target endpoint and determining whether the load metric for the target endpoint satisfies an overload condition, the overload condition specifying an overload threshold over which the target endpoint is considered overloaded. When the load metric satisfies the overload condition for the target endpoint, a fractional portion of traffic for the domain is redirected away from the target endpoint and to an alternate endpoint of the multiple endpoint computing systems, the fractional portion of traffic redirected away from the target endpoint being dependent upon an amount by which the load metric exceeds the overload threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DESCRIPTION

A domain name server (DNS) is used to resolve each user-initiated domain access request to an associated internet protocol (IP) address of an endpoint computing system (e.g., a server or data center hosting data of the domain). When multiple endpoint computing systems provide support for a same domain, a DNS may implement routing rules, such as rules based on geography or other factors, to select one of the multiple endpoint computing systems to service each incoming domain request. In some implementations, DNS servers are capable of querying an endpoint computing system to obtain a binary indication of health. For example, the computing endpoint may transmit back a "1" indicating that the requested server is online and "0" indicating that the requested server is offline. Aside from this binary indication of server health, DNSs generally lack the capability to attain information about the state of various servers. For example, a DNS has no mechanism for determining when one endpoint is experiencing higher-than-average traffic or determining when domain request wait times increase or decrease.

The disclosed technology provides a load balancing intermediary that routes traffic among different endpoint computing systems of a same domain. Routing is performed based on load metrics obtained in association with the individual endpoint computing systems. In one implementation, a traffic manager dynamically implements routing rules to cap traffic at each of the endpoint computing systems in accord with one or more predefined load metric thresholds. For example, a data center may provide the traffic manager with a maximum load metric value for an endpoint computing system (e.g., a cap on energy consumption, total active processing resources, user wait times), and the traffic manager may implement logic to effectively redirect a fraction of incoming requests away from the endpoint when the load metric for the endpoint equals or exceeds the maximum load metric value.

Throughout communications with the various endpoint computing systems and routing directives selectively implemented to alter or override default routing rules, the traffic manager provides a previously-absent level of control over the flows of traffic experienced at individual endpoint computing systems. This technology may be used to realize multiple benefits such as to reduce wait times experienced by users attempting to access requested domains as well as to provide a mechanism for capping power consumption within defined limits associated with each endpoint computing system servicing an individual domain.

FIG. 1 illustrates an example system 100 with a traffic manager 104 for load balancing among multiple endpoint computing systems 110, 112, and 114 servicing a same domain. Although there are three endpoint computing systems shown in FIG. 1, the traffic manager 104 may, in other implementations, perform the herein-described load balancing techniques for domains that have any number of endpoint computing systems.

In general, the term "endpoint computing system" refers to a system with one or more servers, such as an individual server or a data center. In the following description, the term "endpoint" is, at times, used interchangeably with "endpoint computing system." Each of the multiple endpoint computing systems has a different network address (e.g., network addresses 1.2.3.4; 1.2.3.5; and 1.2.3.6), which may be an IP address. In one implementation, the different endpoint computing systems 110, 112, and 114 are different data centers in different geographic locations. For example, the endpoint computing systems 110, 112, and 114 may be different data centers located at geographically diverse locations around the globe (e.g., Asia, North America, Australia) that each provide data for a same domain (e.g., www.bing.com).

In FIG. 1, each of the endpoint computing systems 110, 112, and 114 includes multiple servers. The different servers of an endpoint computing system may be located within a single physical facility or within multiple facilities sharing a common network address element. In other implementations, one or more of the endpoint computing systems 110, 112, and 114 include a single server.

The traffic manager 104 receives inputs from and provides outputs to a DNS 102 which is, for example, an authoritative DNS for a computing device 124, such as a local DNS or a recursive DNS. The DNS 102 includes one or more tables used to resolve domain names to corresponding network addresses (e.g., internet protocol (IP) addresses). When a user 106 initiates a domain access request 122, such as by typing a domain name into a browser on the computing device 124, the computing device 124 sends a DNS query to the DNS 102.

In a traditional routing system, the DNS 102 may alone resolve a requested domain (e.g., bing.com) to a target IP address. In the system 100, however, the traffic manager 104 performs this resolution using information specified in a domain profile 120 for the requested domain as well as load metrics obtained from one or more endpoint computing systems of the domain.

In one implementation, a domain owner creates a domain profile 120 with the traffic manager 104 when subscribing to routing services provided by the traffic manager 104. The traffic manager 104 uses parameters specified within the domain profile 120 along with observed metrics of one or more of the endpoint computing systems 110, 112, and 114 of the domain to resolve the domain access request 122 to a network address.

In one implementation, each of a number of domain profiles 116 registered with the traffic manager 104 is itself accessible at a domain that is different from the domain for which the associated domain profile corresponds to. For example, the domain profile 120 for the domain "bing.com" may be accessed at bing.trafficmanager.net, which is managed by the traffic manager 104. A redirect between a requested domain name and its corresponding traffic manager domain name is, in one implementation, achieved by updating the domain's entry in the DNS 102 to a CNAME entry that aliases the associated domain profile 120 (e.g., www.bing.trafficmanager.net). When a user 106 types a query for a domain (e.g., www.bing.com) into a web browser, the computing device 124 transmits a DNS query to the DNS 102 which, in turn, locates the CNAME identifying the associated domain profile (e.g., www.bing.trafficmanager.net), attempts to resolve this domain, and forwards the request to DNS server(s) 126 of the traffic manager 104.

Upon receipt of a forwarded DNS query request 130, the traffic manager 104 performs operations to select one of multiple associated endpoint computing systems (e.g., 110, 112, and 114) of the domain to service the domain access request 122. In one implementation, the domain profile 120 for a particular domain includes a list of monitored endpoints of the domain that the traffic manager 104 may select a network address from.

In one implementation, the traffic manager 104 uses a base routing methodology, also referred to herein as a "base routing scheme" to initially select a target endpoint from the endpoint computing systems 110, 112, and 114 of the domain for servicing the domain access request 122. After selecting a target endpoint using the base routing scheme, the traffic manager 104 assesses a load metric (e.g., an indicator of traffic) for the target endpoint. For example, the traffic manager 104 may query the target endpoint to request and receive the load metric or the target endpoint may autonomously provide the traffic manager 104 with the load metric, such as by providing periodic updated values.

As used herein, the term "load metric" refers to a calculable metric that varies in proportion to the ability of a particular endpoint computing system to process user traffic. Exemplary load metrics include without limitation measurements of power consumption (e.g., wattage of a data center, CPU utilization, server operating temperature), average response time of an endpoint, HTTP queue length, a number of established connections to the endpoint, a request rate (e.g., requests per second received at the endpoint), network I/O experienced at the endpoint, environmental conditions at the endpoint (e.g., temperature), bandwidth of data flowing to and/or from the endpoint, and other similar metrics. Such load factors can positively or negatively influence a system's ability to process user traffic and thereby inform the traffic manager 104 with information usable to improve load balancing among multiple endpoint computing systems.

In one implementation, the load metric is measured or calculated at the associated endpoint (e.g., a data center). In other implementations, the load metric for an endpoint is measured or calculated by a third party, such as a power distribution facility that provides power to servers located at the endpoint. In still another implementation, the load metric is a perceived metric that is determined independently by the traffic manager 104. For example, traffic manager 104 may probe the target endpoint with a query and use the endpoint's response time as the load metric.

If the traffic manager 104 determines that load metric for the target endpoint does not satisfy an overload condition (e.g., is less than a specified overload threshold), the traffic manager 104 outputs a network address 132 of the target endpoint, effectively directing the computing device 124 to the target endpoint.

If, however, the traffic manager 104 determines that the load metric does satisfy an overload condition (e.g., is greater than a specified overload threshold), the traffic manager 104 performs steps to select an alternate endpoint and also to redirect a fractional portion of incoming requests normally directed to the target endpoint away from the endpoint for a future period of time. As used herein, a request is "normally directed" to the target endpoint when the base routing scheme would otherwise route the request to that endpoint. For example, a base routing scheme that uses geographical proximity would normally route a request to the closest healthy endpoint. Similar to this, the term "normal endpoint" is used herein to refer to the endpoint for a domain that would be selected to service a request per the base routing scheme absent implementation of one or more load-motivated re-routing actions.

In one implementation, the traffic manager 104 marks the target endpoint as unhealthy for the domain access request 122 when the corresponding load metric satisfies the overload condition. In this case, the traffic manager 104 defers to the base routing scheme to select a next-best endpoint under the same logic for which the target endpoint was initially selected. In the above example where the base routing scheme uses geographical proximity, the traffic manager 104 may mark the closest endpoint as unhealthy when the overload condition is satisfied and apply the base routing scheme to select a next closest endpoint to service the domain access request 122.

In addition to selecting an alternate endpoint for the domain access request 122, the traffic manager 104 may also determine a load shed metric representing a fractional percentage of incoming traffic normally directed to the endpoint that is to be routed away from the target endpoint over the future period of time. If, for example, the load metric for a target endpoint exceeds a set threshold value by 6 percent, the load shed metric may indicate that 6% of traffic normally directed to the target endpoint is to be routed away from the endpoint over a future time interval, also referred to herein as a "rebalancing period." In this case, the traffic manager 104 routes the domain access request 122 to the alternate endpoint and redirects 6% of incoming requests receiving during the rebalancing period and targeting the normal endpoint (e.g., the endpoint 208) to the alternate endpoint instead. At the end of the rebalancing interval, the traffic manager 104 obtains an updated load metric for the endpoint and repeats the same logic—e.g., calculating a new load shed metric if the endpoint is still overloaded and adjusting redirection parameters or, if the endpoint is not overloaded, marking the endpoint as healthy and allowing traffic flows to resume unrestricted as dictated by the base routing scheme.

Prior to implementing the above-described rebalancing scheme, the traffic manager 104 may assess the load metric for the selected alternate endpoint to ensure that the alternate endpoint is not overloaded. If the load metric satisfies an overload condition for the alternate endpoint, the traffic manager may also mark the alternate endpoint as unhealthy and defer to the base routing scheme to select a different alternate endpoint (e.g., third-best endpoint) under the same logic for which the target endpoint and the alternate endpoint were selected.

Figure 2A:
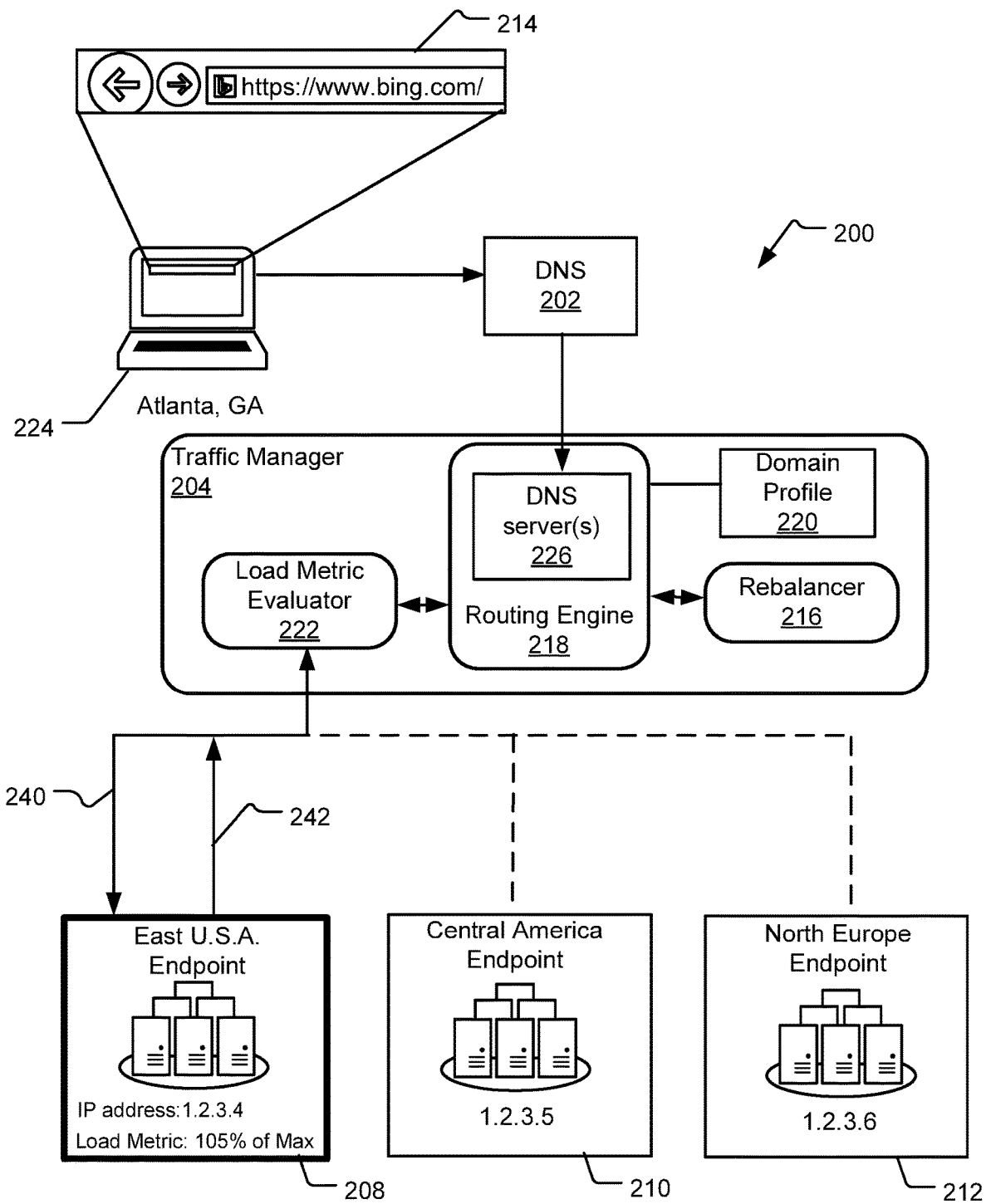
FIG. 2A illustrates another example system with a traffic manager performing actions for load balancing among multiple endpoint computing systems servicing a same domain.

FIG. 2A illustrates another example system 200 with a traffic manager 204 performing actions for load balancing among multiple endpoint computing systems 208, 210, and 212 servicing a same domain. In the illustrated example, a domain access request 214 identifies a requested domain. The domain access request 214 originates at a computing device 224 in Atlanta, Ga. An authoritative DNS 202 for the computing device 224 receives the query and forwards the domain access request 214 to DNS servers 226 of a traffic manager 204, such as according to the same or similar techniques described with respect to FIG. 1.

In FIG. 2A, the domain access request 214 is associated with a domain profile 220 maintained by the traffic manager 204. In one implementation, the domain profile 220 identifies a list of endpoint computing systems of the requested domain that are monitored by the traffic manager 204. In some implementations, the domain profile 220 additionally identifies a type of base routing scheme for use in resolving requests to access the associated domain. In one implementation, the base routing scheme employs geographic fencing rules designed to selectively route each request to an endpoint that is to be geographically-closest to an origin of the request (e.g., Atlanta, Ga.). In another implementation, the base routing scheme identifies preferred endpoint(s) that are to be selected whenever certain conditions are met. In still other implementations of the technology may implement countless other base routing schemes.

The traffic manager 204 includes a routing engine 218, rebalancer 216 and a load metric evaluator 222 that work together to resolve each incoming domain access request to an associated network address. In the illustrated example, the routing engine 218 applies a base routing scheme that routes selectively based on geographic proximity. The routing engine 218 determines that the endpoint computing system 208, located in the eastern United States, is the geographically closest endpoint to the source of the domain access request 214, which originated in Atlanta, Ga. Here, the routing engine 218 selects the endpoint computing system 208 as the target endpoint.

The routing engine 218 communicates an identifier of the target endpoint to the load metric evaluator 222, and the load metric evaluator 222 obtains and evaluates a load metric for the target endpoint. For example, the traffic manager 204 may transmit a query 240 to the target endpoint to request the load metric. Responsive to the query 240, the target endpoint transmits a response 242 including a load metric value quantifying a load at the endpoint. In another implementation, the target endpoint autonomously provides the traffic manager 204 with the load metric, such as by providing periodic updated measurements of the load metric.

The load metric may take on different forms in different implementations including without limitation the various forms discussed above with respect to FIG. 1. In one implementation, the load metric represents a percent of an overload threshold that the target endpoint is currently experiencing. In one implementation, the overload threshold is specified by an overload condition for the target endpoint 208 and the target endpoint 208 is considered overloaded whenever the received load metric exceeds the overload threshold.

In the illustrated example, the target endpoint 208 reports back that the load is at 105% of a designated threshold. In other implementations, the load metric may be an array of values, such as an array with a first index indicating a measured load value and a second index indicating a maximum threshold for the measured load value. In this case, an overload condition is satisfied when the measured load value exceeds the maximum threshold.

In some implementations, a domain owner may select a custom metric (e.g., energy consumption, response time, available bandwidth) and/or designate an associated overload condition within its domain profile 220. For example, the domain profile 220 for www.bing.com may desire to set an overload condition that is satisfied when an endpoint has an average response time of greater than 3 seconds. The overload condition may, in some implementations, be customized for different domains as well as for each individual endpoint of a same domain. In some instances, multiple different overload conditions may be designated for a single endpoint.

Upon receipt of the load metric for the target endpoint, the load metric evaluator 222 evaluates the load metric in view of the associated overload condition(s) to determine whether the endpoint is overloaded. In the illustrated example, the load metric evaluator 2222 determines the overload condition is satisfied for the target endpoint 208 and calculates a load shed metric for the target endpoint 208. In one implementation, the load shed metric represents a percentage of traffic normally directed to the target endpoint that is to be routed away from the endpoint over a rebalancing period.

In one implementation, the amount of traffic that is routed away from the endpoint over the rebalancing period is dependent upon an amount by which the received load metric exceeds the overload threshold for the target endpoint. For example, the load metric evaluator 222 may determine that N requests were routed to the target endpoint in a last timeframe (TTL) and that a number, N–M, represents a maximum number of requests that could have been received at the target endpoint during the timeframe TTL without satisfying the overload condition. Here, an exemplary load shed metric may be given by a fraction (M–N)/(N) and the rebalancer 216 may direct this fraction of incoming requests normally directed to the target endpoint to another endpoint over a next timeframe of equal length to the timeframe TTL.

In another implementation, the load shed metric is computed by a proportional-integral-derivative (PID) controller that continuously calculates an error value (e(t)) as the different between a desired setpoint (SP) and an observed load metric value (MV) according to techniques known in the art. A PID controller determines a correction based on a proportional term (e.g., how far the setpoint is from the observed load metric); an integral term (e.g., how long the observed load metric has been away from the load metric); and a derivative term (e.g., how fast the difference between the observed load metric and the setpoint is changing). For example, the PID controller may read real-time load metrics about one or more endpoints of a domain and execute the above logic to compute a load shed metric for those endpoint(s). In one implementation, the output of the PID controller is a normalized percentage value per endpoint indicating a percentage of traffic normally directed to the endpoint (e.g., via the base routing scheme) that is to be routed away from the endpoint over a future time interval.

In the simplified example of FIG. 2A, the load metric indicates that the current load is 105% of a predefined maximum threshold. In this example, the load metric evaluator 222 calculates a load shed metric of 5%.

Figure 2B:
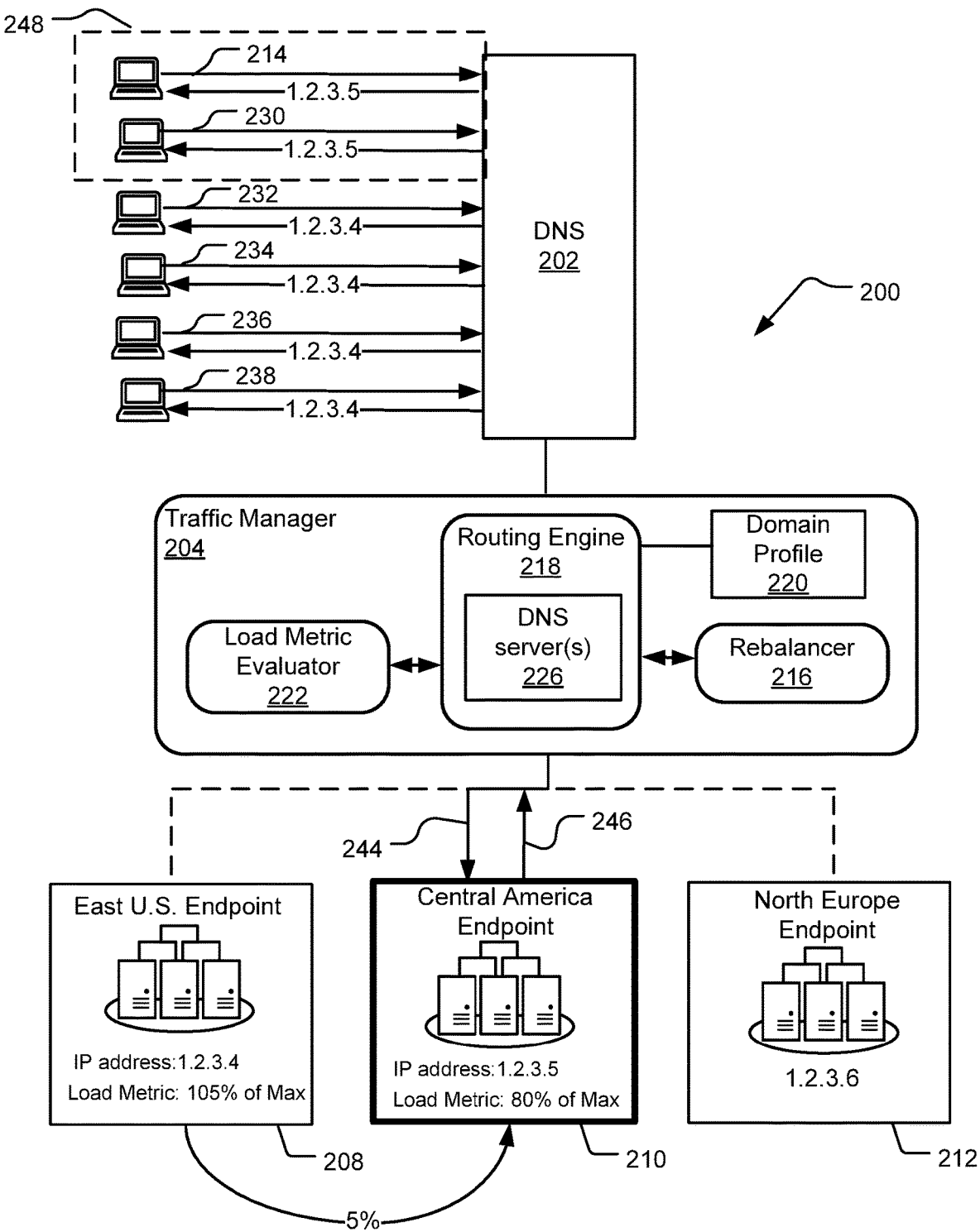
FIG. 2B illustrates the system of FIG. 2A performing further load balancing actions.

FIG. 2B illustrates the system 200 at a time following the exemplary load balancing actions described with respect to FIG. 2A. As described with respect to FIG. 2A, the load metric evaluator 222 determines that the endpoint 208 is overload in the course of performing routing operations for a domain access request 214. During a subsequent time period also referred to herein as a "rebalancing period" the traffic manager 204 receives a number of additional requests (e.g., 230, 232, 234, 234, and 236) to access the same domain (e.g., "bing.com"). Under a base routing scheme of the routing engine 218, these additional request would be normally directed to the endpoint 208.

Since the endpoint 208 has been identified as overloaded, the traffic manager 204 takes actions to selectively redirect a fraction 248 of these new incoming requests to an alternate endpoint of the domain.

In one implementation, the routing engine 218 uses the same base routing scheme to select the alternate endpoint as used to select the initial target endpoint. For example, the routing engine 218 removes the endpoint 208 from the pool of available endpoints and again applies the geographic proximity routing scheme to select a next best endpoint. In the illustrated example, the routing engine selects the endpoint 210 (in central America) as the alternate endpoint.

Prior to re-routing traffic to the endpoint 210, the load metric evaluator 222 transmits a query 244 to the endpoint 210 to request a load metric. The endpoint 210 transmits a response 246 including a recently-measured or calculated value for the load metric. The load metric evaluator 222 evaluates the received value to determine whether or not an overload condition is satisfied for the alternate endpoint, such as by applying the same or similar logic to that described above. If the load metric for the endpoint 210 satisfies the overload condition (e.g., exceeds a specified overload condition), the routing engine 218 again applies the base routing scheme to select a next-best endpoint as the alternate endpoint, ensuring that the alternate endpoint finally selected has an associated load metric that does not satisfy the overload condition(s) for that endpoint.

In FIG. 2B, the endpoint 210 is selected as the alternate endpoint for servicing the domain access request 214 as well as the redirected fraction 248 of the new incoming requests that are received during the rebalancing period and normally directed to the target endpoint (e.g., the endpoint 210). The traffic manager 204 responds to the domain access request 214 with a network address (e.g., 1.2.3.5) for the alternate endpoint (e.g., the endpoint 212), which effectively directs the domain access request 214 to the alternate endpoint.

In addition to redirecting the domain access request 214, the routing engine 218 and the rebalancer 216 work in concert to achieve a selective redirection of the other incoming domain access requests 230, 232, 234, 236, and 238 according to the calculated load shed metric. For each incoming request received during the rebalancing period, the routing engine 218 applies the base routing scheme. When the base routing scheme selects the endpoint 208 as the receiving endpoint (e.g., the endpoint currently overloaded), the rebalancer 216 determines whether the request is to be included among the redirected fraction 248. This determination may, for example, be random or based on other selection logic. In the illustrated example, the redirected fraction 248 includes the domain access requests 214 and 230, which are selectively directed away from the associated normal endpoint (e.g., the endpoint 210) and to the alternate endpoint (e.g., the endpoint 212).

In one implementation, the routing engine 218 preferentially permits users previously viewing data of the domain via the normal endpoint to continue to view data on the alternate endpoint. For example, the routing engine may determine that the domain access request 232 is from a user previously connected to a first subpage of the domain (e.g., www.bing.com/news/article1) that is requesting access to a different subpage of the domain (e.g., www.bing.com/new/article2). In this case, the selection logic of the routing engine 218 may direct the request 232 to the endpoint 210, despite the fact that it is overloaded. This prevents the endpoint 210 from going idle and may help to mitigate apparent wait times for the already-connected users. In contrast, a new request from a user that is not already viewing data of the domain may be preferentially included in the redirected fraction 248 serviced by the selected alternate endpoint (e.g., endpoint 212).

At the end of the rebalancing period, the load metric evaluator 222 obtains an updated load metric for the endpoint 208 and the routing engine 218 and rebalancer 216 repeat the above-described logical operations. If the endpoint 208 is still overloaded, the rebalancer 216 may calculate a new load shed metric and commence a new rebalancing period wherein a different fraction (based on the new load shed metric) of the incoming requests for the endpoint 208 are selectively routed away from the endpoint.

If, alternatively, the endpoint 208 is not overloaded at the termination of the rebalancing period, the rebalancer 216 may again mark the endpoint 208 as healthy and lift the previously-imposed restrictions on access to this endpoint.

Figure 3:
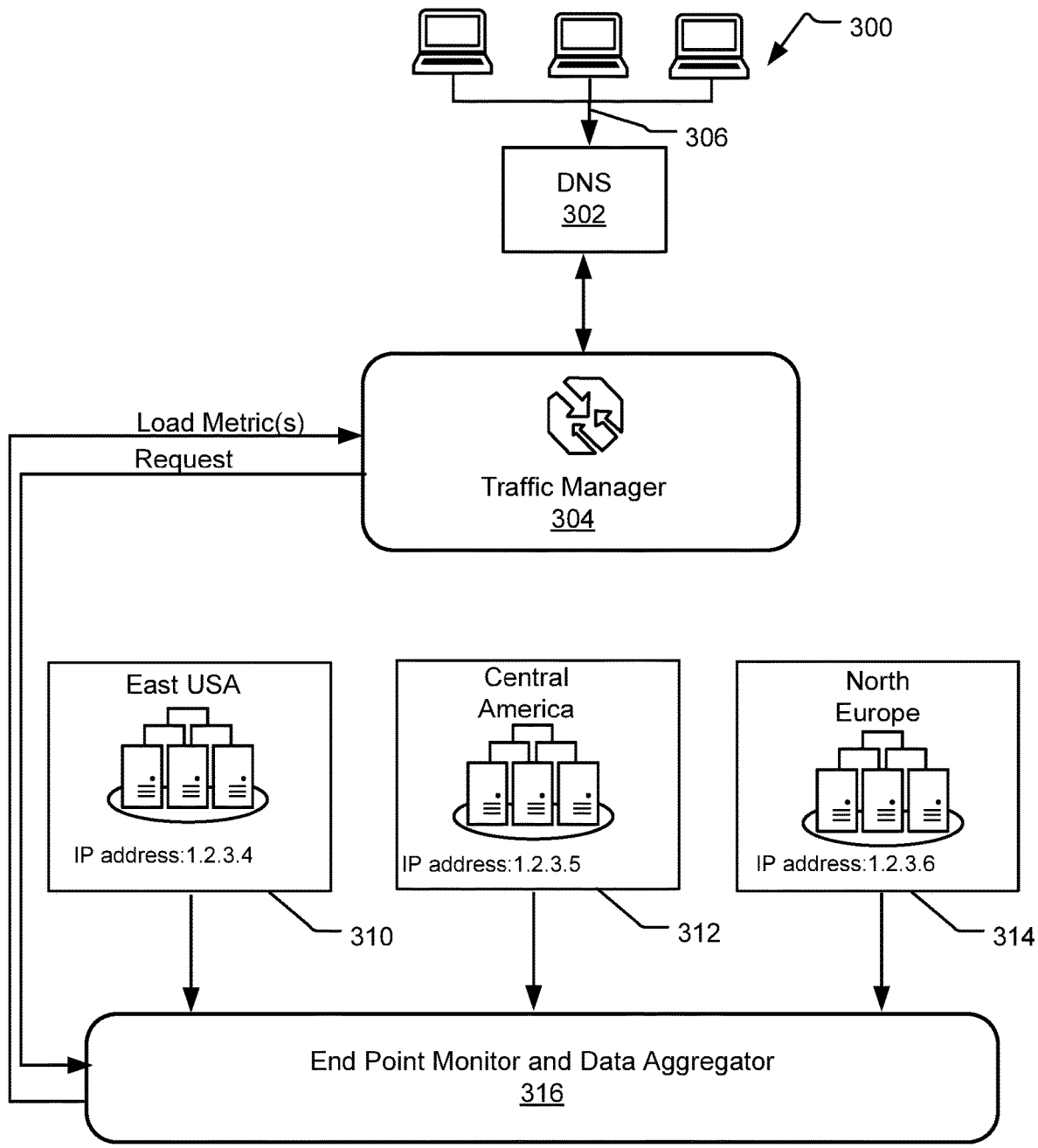
FIG. 3 illustrates yet another example system with a traffic manager for load balancing among multiple endpoint computing systems servicing a same domain.

FIG. 3 illustrates another example system 300 with a traffic manager 304 for load balancing among multiple endpoint computing systems 310, 312, and 314 servicing a same domain. The traffic manager 304 receives domain access requests 306 from a DNS 302 and resolves those requests to network addresses which are returned to the DNS 302 and propagated back the requesting devices, such as in the manner described above. The traffic manager 304 may include logical components the same or similar those described above with respect to the systems of FIGS. 1, 2A, and 2B. However, unlike these systems, the traffic manager 304 does not query the endpoint computing systems 310, 312, and 314 directly for load metrics. Rather, traffic manager 304 queries an end point monitor and data aggregator 316 with a request to report the load metric for the various endpoints. The end point monitor and data aggregator 316 serves as an intermediary that collects and aggregates traffic and load data from the endpoints associated with a same domain. For example, the traffic manager 304 transmits a request identifying a target endpoint and, in some implementations, a parameter identifying a requested load metric.

Using a centralized computing entity (e.g., the end point monitor and data aggregator 316) to monitor and report load metrics in this manner may enable the traffic manager 304 to make routing decisions based on a more complete picture of each of the end points. If the traffic manager 304 requests a load metric from an individual server at a data center (e.g., in a manner the same or similar to that described above with respect to FIGS. 2A and 2B), there may exist times when the server indicates it is overloaded but the data center as a whole is not overloaded. For example, the load metric may quantify an average queue length. In some configurations, an individual server may not have visibility into the average queue lengths of other servers at the endpoint. By configuring the different endpoint servers to mutually report respective load metrics to an endpoint monitor, the traffic manger may be provided with a load metric that more accurately represents the traffic at the endpoint as a whole.

Figure 4:
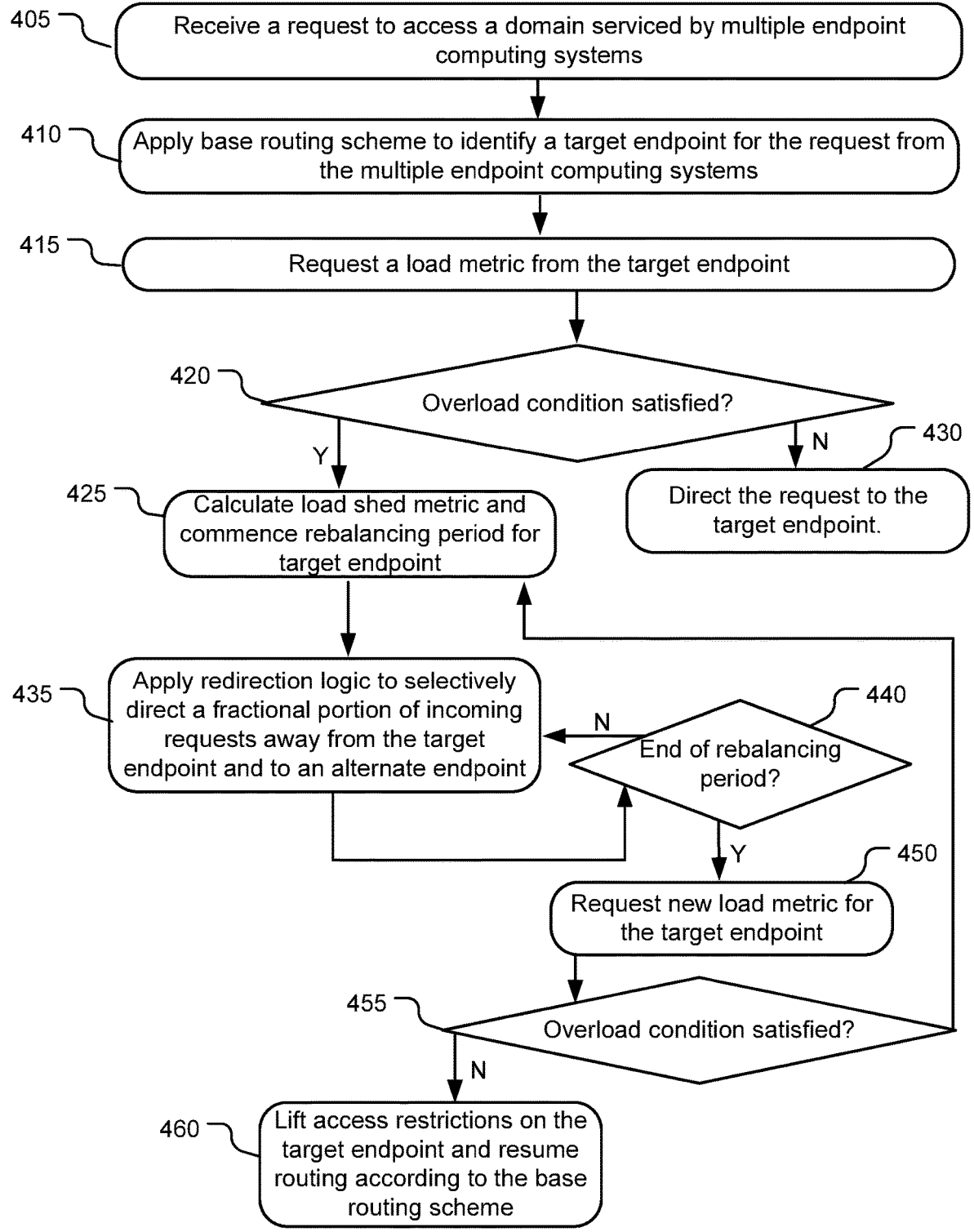
FIG. 4 illustrates example operations for load balancing domain access requests among multiple endpoint computing systems servicing a same domain.

FIG. 4 illustrates example operations 400 for load balancing domain access requests among multiple endpoint computing systems servicing a same domain. A receiving operation 405 receives a request to access a domain that is serviced by multiple endpoint computing systems. A routing operation 410 applies a base routing scheme to identify a target endpoint that is the normal endpoint to receive the request (e.g., absent implementation of load re-balancing routing rules). A requesting operation 415 requests a load metric from the target endpoint. Responsive to receipt of a load metric value from the target metric, a determination operation 420 determines whether the load metric satisfies an overload condition. If the received load metric does not satisfy an overload condition, a direction operation 430 directs the request to the target endpoint, such as by providing the IP address of the target endpoint to an authorized DNS server of the computing that initiated the domain access request.

If the received load metric does satisfy the overload condition, a calculation operation 425 calculates a load shed metric based on the load metric and a rebalancing period commences for the target endpoint. The load shed metric is dependent upon an amount by which the received load metric exceeds an overload threshold for the target endpoint. In one implementation, the load shed metric represents a percentage of organic traffic for the target endpoint (e.g., traffic normally received at the target endpoint per the base routing scheme) that is to be routed away from the target endpoint over a rebalancing period.

A redirection operation 435 applies redirection logic to selectively direct a fractional portion of incoming domain access requests away from the target endpoint and to an alternate endpoint. In one implementation, the fraction portion of traffic that is redirected is determined based on the calculated load shed metric. If, for example, the load shed metric indicates that 10% of incoming requests are to be redirected away from the target endpoint, the redirection logic provides for selective redirection of 10% of incoming requests received during the load balancing period that would, except for such redirection, be normally directed to the target endpoint.

When a determination operation 440 determines that the rebalancing period has terminated, a requesting operation 450 requests a new load metric from the target endpoint. Another determination operation 455 determines whether or not the new load metric satisfies the overload condition. If the overload metric is satisfied by the new load metric, the calculation operation 425 calculates a new load shed metric and a new rebalancing period commences with the redirection logic being selectively implemented to effectuate redirects of a fractional portion of traffic based on the newly-calculated load shed metric.

If the determination operation 455 determines that the new load metric does not satisfy the overload condition, a restriction lifting operation 460 lifts access restrictions on the target endpoint and routing is resumed according to the base routing scheme.

Figure 5:
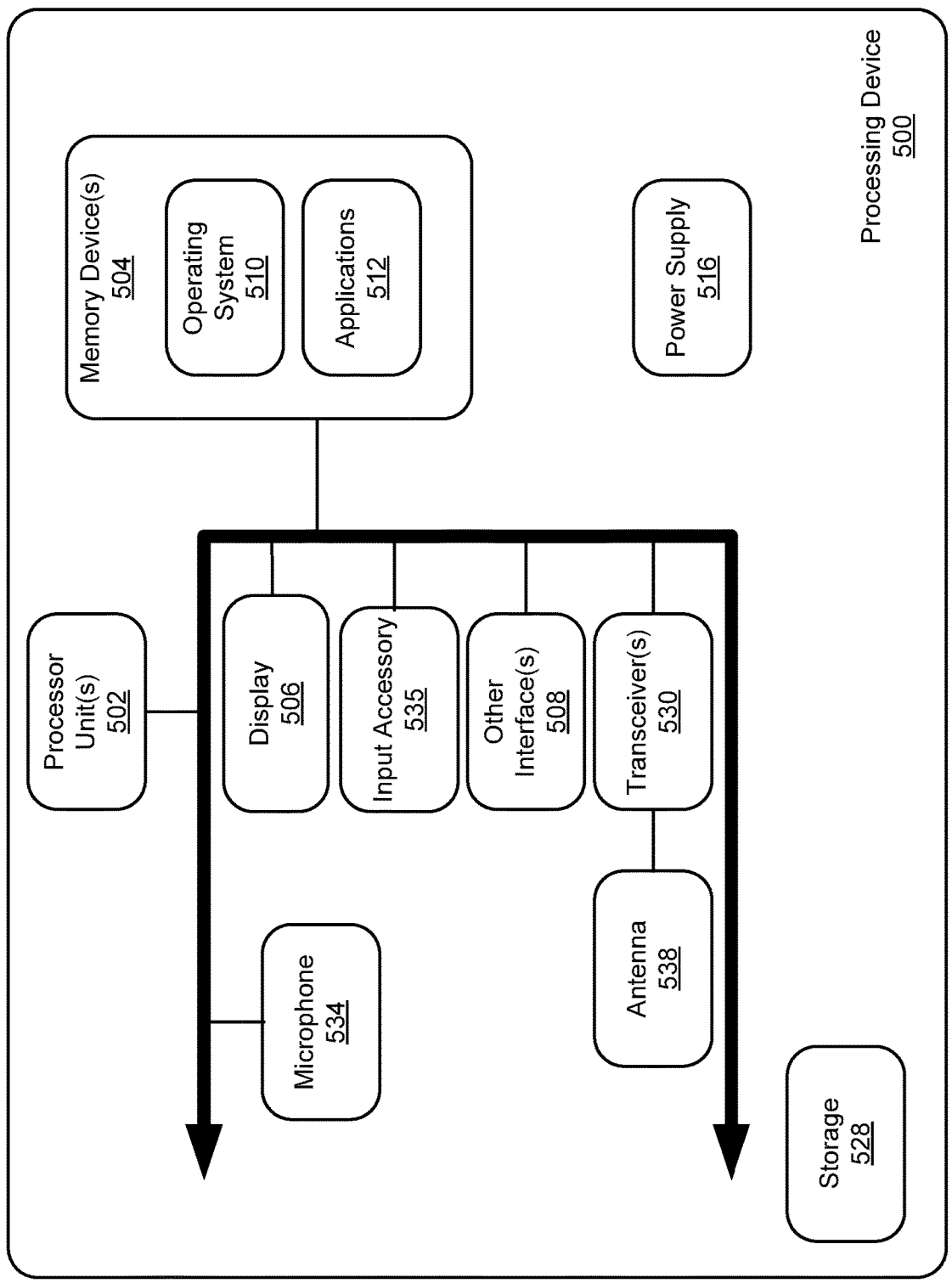
FIG. 5 illustrates an example schematic of a processing device suitable for implementing aspects of the disclosed technology.

FIG. 5 illustrates an example schematic of a processing device 500 suitable for implementing aspects of the disclosed technology. The processing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more applications 512, such as the traffic manager 204 of FIG. 2 or its submodules (e.g., the load metric evaluator 222, routing engine 218, or rebalancer 216) are loaded in the memory 504 and executed on the operating system 510 by the processor unit(s) 502. Applications 512 may receive input from various input local devices such as a microphone 534, input accessory 535 (e.g., keypad, mouse, stylus, touchpad, gamepad, racing wheel, joystick). Additionally, the applications 512 may receive input from one or more remote devices, such as remotely-located smart devices, by communicating with such devices over a wired or wireless network using more communication transceivers 530 and an antenna 538 to provide network connectivity (e.g., a mobile phone network, Wi-Fi®, Bluetooth®). The processing device 500 may also include various other components, such as a positioning system (e.g., a global positioning satellite transceiver), one or more accelerometers, one or more cameras, an audio interface (e.g., the microphone 534, an audio amplifier and speaker and/or audio jack), and storage devices 528. Other configurations may also be employed.

The processing device 500 further includes a power supply 516, which is powered by one or more batteries or other power sources and which provides power to other components of the processing device 500. The power supply 516 may also be connected to an external power source (not shown) that overrides or recharges the built-in batteries or other power sources. In an example implementation, a task-scheduling recommendation tool may include hardware and/or software embodied by instructions stored in the memory 504 and/or the storage devices 528 and processed by the processor unit(s) 502. The memory 504 may be the memory of a host device or of an accessory that couples to the host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method for load balancing among multiple endpoint computing systems of a domain addressable by a different network addresses comprises receiving a domain name server (DNS) request to access the domain; identifying a target endpoint for the DNS request from the multiple endpoint computing systems based on routing logic for the domain; obtaining a load metric for the target endpoint; determining whether the load metric for the target endpoint satisfies an overload condition the overload condition specifying an overload threshold over which the target endpoint is considered overloaded; and redirecting a fractional portion of traffic of the domain away from the target endpoint and to an alternate endpoint of the multiple endpoint computing systems in response to determining that the load metric for the target endpoint satisfies the overload condition, the fractional portion of traffic redirected away from the target endpoint being dependent upon an amount by which the load metric exceeds the overload threshold In still another example method of any preceding method, the method further comprises calculating the fractional portion of the traffic to redirect away from the target endpoint based on the overload condition and the obtained load metric.

In yet another example method of any preceding method, the method further comprises querying the target endpoint to request the load metric responsive to receipt of the DNS request and receiving the load metric responsive to the request.

In yet another example method of any preceding method, the target endpoint is the endpoint computing system having a closest geographic proximity to an origin of the DNS request and redirecting the fractional portion of traffic away from the target endpoint further comprises: identifying an alternate endpoint of the multiple endpoint computing systems, the alternative endpoint having a next-closest geographic proximity to the origin of the DNS request, and obtaining the load metric for the alternate endpoint. The method further comprises determining whether the load metric satisfies the overload condition for the alternate endpoint; and redirecting the fractional portion of the traffic to the alternate endpoint when the obtained load metric does not satisfy the overload condition.

In yet another example method, redirecting the fractional portion of traffic of the domain away from the target endpoint and to an alternate endpoint further comprises: redirecting the fractional portion of traffic of the domain away from the target endpoint throughout a rebalancing period; requesting a new load metric for the target endpoint responsive to termination of the rebalancing period; determining whether the new load metric satisfies the overload condition; and ceasing to redirect the fraction portion of the traffic of the domain away from the target endpoint responsive to a determination that the new load metric does not satisfy the overload condition.

In still another example method of any preceding method, the load metric depends upon a quantity of user traffic being serviced at the target endpoint.

In still another example method of any preceding method, the load metric is a measurement of at least one metric selected from a group comprising: power consumption, average response time, a number of established connections, and available data bandwidth.

An example system for load balancing comprises: multiple endpoint computing systems servicing a domain and each being addressable by a different network address; and a traffic manager stored in memory and executable to receive a domain name server (DNS) request to access the domain; identify a target endpoint for the DNS request from the multiple endpoint computing systems based on routing logic for the domain; obtain a load metric for the target endpoint; determine whether the load metric for the target endpoint satisfies an overload condition; and redirect a fractional portion of traffic of the domain away from the target endpoint and to an alternate endpoint of the multiple endpoint computing systems in response to determining that the load metric for the target endpoint satisfies the overload condition.

In another example system of any preceding system, the overload condition specifies an overload threshold over which the target endpoint is considered overloaded and the fractional portion of traffic redirected away from the target endpoint is dependent upon an amount by which the load metric exceeds the overload threshold.

In another example system of any preceding system, the traffic manager is further executable to calculate the fractional portion of the traffic to redirect away from the target endpoint based on the overload condition and the obtained load metric.

In still another example system of any preceding system, the traffic manager is further executable to: query the target endpoint to request the load metric responsive to receipt of the DNS request and to receive the load metric responsive to the request.

In yet still another system of any preceding system, the target endpoint is the endpoint computing system having a closest geographic proximity to an origin of the DNS request and the traffic manager redirects the fractional portion of traffic away from the target endpoint by identifying an alternate endpoint of the multiple endpoint computing systems and obtaining the load metric for the alternate endpoint, where the alternative endpoint is an endpoint having a next-closest geographic proximity to the origin of the DNS request. The traffic manager determines whether the load metric satisfies the overload condition for the alternate endpoint; and redirects the fractional portion of the traffic to the alternate endpoint responsive to determining that the obtained load metric satisfies the overload condition.

In another example system of any preceding system, the traffic manager is further executable to: redirect the fractional portion of traffic of the domain away from the target endpoint throughout a rebalancing period; request a new load metric for the target endpoint responsive to termination of the rebalancing period; determine whether the new load metric satisfies the overload condition; and cease redirecting the fractional portion of the traffic of the domain away from the target endpoint responsive to a determination that the new load metric does not satisfy the overload condition.

In still another example system of any preceding system, the load metric depends upon a quantity of user traffic being serviced at the target endpoint.

In yet still another example system of any preceding system, the load metric is a measurement of at least one metric selected from a group comprising: power consumption, average response time, a number of established connections, and available data bandwidth.

An example memory device disclosed herein encodes computer-executable instructions for executing a computer process for load balancing among multiple endpoint computing systems of a domain, each of the multiple endpoint computing systems being addressable by a different network address. The computer process comprises receiving a domain name server (DNS) request to access the domain; identifying a target endpoint from the multiple endpoint computing systems based on routing logic for the domain; obtaining a load metric for the target endpoint; determining whether the load metric for the target endpoint satisfies an overload condition; and redirecting a fractional portion of traffic of the domain away from the target endpoint and to an alternate endpoint of the multiple endpoint computing systems in response to determining that the load metric for the target endpoint satisfies the overload condition.

In an example memory device of any preceding memory device, the overload condition specifies an overload threshold over which the target endpoint is considered overloaded and the fractional portion of traffic redirected away from the target endpoint is dependent upon an amount by which the load metric exceeds the overload threshold.

In an example memory device of any preceding memory device, the computer process further comprises calculating the fractional portion of the traffic to redirect away from the target endpoint based on the overload condition and the obtained load metric.

In yet still another example memory device of any preceding memory device, the computer process further comprises querying the target endpoint to request the load metric responsive to receipt of the DNS request; and receiving the load metric responsive to the request.

In yet still another example memory device of any preceding memory device, the target endpoint is the endpoint computing system having a closest geographic proximity to an origin of the DNS request.

An example system for load balancing among multiple endpoint computing systems of a domain comprises multiple endpoint computing systems servicing the domain and each being addressable by a different network address; and a traffic manager stored in memory and executable to receive a domain name server (DNS) request to access the domain; identify a target endpoint for the DNS request from the multiple endpoint computing systems based on routing logic for the domain; obtain a load metric for the target endpoint; determine whether the load metric for the target endpoint satisfies an overload condition; and redirect a fractional portion of traffic of the domain away from the target endpoint and to an alternate endpoint of the multiple endpoint computing systems in response to determining that the load metric for the target endpoint satisfies the overload condition.

An example method for load balancing among multiple endpoint computing systems of a domain addressable by a different network addresses comprises a means for receiving a domain name server (DNS) request to access the domain; a means for identifying a target endpoint for the DNS request from the multiple endpoint computing systems based on routing logic for the domain; a means for obtaining a load metric for the target endpoint; a means for determining whether the load metric for the target endpoint satisfies an overload condition, the overload condition specifying an overload threshold over which the target endpoint is considered overloaded; and a means for redirecting a fractional portion of traffic of the domain away from the target endpoint and to an alternate endpoint of the multiple endpoint computing systems in response to determining that the load metric for the target endpoint satisfies the overload condition, the fractional portion of traffic redirected away from the target endpoint being dependent upon an amount by which the load metric exceeds the overload threshold.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method of load balancing among multiple endpoint computing systems of a domain comprising:
   receiving a domain name server (DNS) request to access the domain, each of the multiple endpoint computing systems servicing the domain being addressable by a different network address;
   identifying a target endpoint for the DNS request from a pool of the multiple endpoint computing systems based on routing logic for the domain;
   obtaining a load metric for the target endpoint and a load metric for at least one other endpoint computing system of the multiple endpoint computing systems;
   determining whether the obtained load metric for the target endpoint satisfies a first overload condition, the first overload condition specifying a first overload threshold over which the target endpoint is considered overloaded;
   determining whether the obtained load metric for the at least one other endpoint computing system satisfies a second overload condition, the second overload condition specifying a second overload threshold over which the at least one other endpoint computing system is considered overloaded; and
   redirecting a fractional portion of traffic of the domain away from the target endpoint and to the at least one other endpoint computing system of the multiple endpoint computing systems in response to determining that the obtained load metric for the target endpoint satisfies the first overload condition and to determining that the obtained load metric for the at least one other endpoint computing system does not satisfy the second overload condition, the fractional portion of traffic redirected away from the target endpoint being dependent upon an amount by which the load metric exceeds the first overload threshold.

2. The method of claim 1, wherein determining that the obtained load metric for the target endpoint satisfies the first overload condition further comprises:
   calculating the fractional portion of the traffic to redirect away from the target endpoint based on the first overload condition and the obtained load metric.

3. The method of claim 1, further comprising:
   querying the target endpoint to request the load metric responsive to receipt of the DNS request; and
   receiving the load metric responsive to the request.

4. The method of claim 1, wherein the target endpoint has a closest geographic proximity to an origin of the DNS request, one of the at least one other endpoint computing system has a next-closest geographic proximity to the origin of the DNS request, and further comprising:
   identifying the one of the at least one other endpoint computing system from the pool of the multiple endpoint computing systems based on the routing logic for the domain.

5. The method of claim 4, wherein redirecting the fractional portion of traffic of the domain away from the target endpoint and to the at least one other endpoint computing system further comprises:
   redirecting the fractional portion of traffic of the domain away from the target endpoint throughout a rebalancing period;
   requesting a new load metric for the target endpoint responsive to termination of the rebalancing period; and
   determining whether the new load metric satisfies the first overload condition; and
   stop redirecting the fractional portion of the traffic of the domain away from the target endpoint responsive to a determination that the new load metric does not satisfy the first overload condition.

6. The method of claim 1, wherein the load metric depends upon a quantity of user traffic being serviced at the target endpoint.

7. The method of claim 1, wherein the load metric is a measurement of at least one metric selected from a group comprising:
   power consumption, average response time, and available data bandwidth.

8. The method of claim 1, further comprising:
   removing the target endpoint from the pool of the multiple endpoint computing systems for a rebalancing period, responsive to determining that that the obtained load metric for the target endpoint satisfies the first overload condition;
   receiving another domain name server (DNS) request to access the domain; and
   identifying a different target endpoint for the DNS request from the pool of multiple endpoint computing systems based on the routing logic for the domain during the rebalancing period.

9. The method of claim 1, further comprising:
   lifting accessing restrictions on the target endpoint after expiration of a rebalancing period, responsive to removing the target endpoint from the pool of the multiple endpoint computing systems and identifying a different target endpoint for the DNS request from the pool of multiple endpoint computing systems based on the routing logic for the domain during the rebalancing period.

10. The method of claim 1, wherein the operations of determining whether the obtained load metric for the target endpoint satisfies the first overload condition and determining whether the obtained load metric for the at least one other endpoint computing system satisfies the second overload condition are performed concurrently.

11. The method of claim 1, wherein the obtained load metric for the target endpoint is based on aggregated load metrics obtained from multiple servers at the target endpoint.

12. The method of claim 1, wherein the load metrics for the target endpoint and the load metric for at least one other endpoint computing system are collected load data from endpoints associated with the same domain.

13. A system for load balancing among multiple endpoint computing systems of a domain, the system comprising:
   memory;
   multiple endpoint computing systems servicing the domain and each being addressable by a different network address; and
   a traffic manager stored in the memory and executable to:
      receive a domain name server (DNS) request to access the domain;
      identify a target endpoint for the DNS request from a pool of the multiple endpoint computing systems based on routing logic for the domain;
      obtain a load metric for the target endpoint and a load metric for at least one other endpoint computing system of the multiple endpoint computing systems;
      determine whether the load metric for the target endpoint satisfies a first overload condition;
      determine whether the obtained load metric for the at least one other endpoint computing system satisfies a second overload condition; and
      redirect a fractional portion of traffic of the domain away from the target endpoint and to the at least one other endpoint computing system of the multiple endpoint computing systems in response to determining that the load metric for the target endpoint satisfies the first overload condition and the at least one other endpoint computing system does not satisfy the second overload condition.

14. The system of claim 13, wherein the first overload condition specifies a first overload threshold over which the target endpoint is considered overloaded and the fractional portion of traffic redirected away from the target endpoint is dependent upon an amount by which the obtained load metric exceeds the first overload threshold.

15. The system of claim 13, wherein the traffic manager is further executable to:
   calculate the fractional portion of the traffic to redirect away from the target endpoint based on the first overload condition and the obtained load metric for the target endpoint.

16. The system of claim 13, wherein the traffic manager is further executable to:
   query the target endpoint to request the load metric responsive to receipt of the DNS request; and
   receive the load metric responsive to the request.

17. The system of claim 13, wherein the target endpoint has a closest geographic proximity to an origin of the DNS request, one of the at least one other endpoint computing system has a next-closest geographic proximity to the origin of the DNS request, and wherein the traffic manager is further executable to:
   identify the one of the at least one other endpoint computing system from the pool of the multiple endpoint computing systems based on the routing logic for the domain.

18. The system of claim 13, wherein the traffic manager is further executable to:
   redirect the fractional portion of traffic of the domain away from the target endpoint throughout a rebalancing period;
   request a new load metric for the target endpoint responsive to termination of the rebalancing period; and
   determine whether the new load metric satisfies the overload condition; and
   stop redirecting the fractional portion of the traffic of the domain away from the target endpoint responsive to a determination that the new load metric does not satisfy the overload condition.

19. The system of claim 13, wherein the obtained load metric depends upon a quantity of user traffic being serviced at the target endpoint.

20. The system of claim 13, wherein the obtained load metric is a measurement of at least one metric selected from a group comprising:
   power consumption, average response time, and available data bandwidth.

21. One or more memory devices encoding computer-executable instructions for executing a computer process for load balancing among multiple endpoint computing systems of a domain, the computer process comprising:
   receiving a domain name server (DNS) request to access the domain, each of the multiple endpoint computing systems servicing the domain being addressable by a different network address;
   identifying a target endpoint for the DNS request from a pool of the multiple endpoint computing systems based on routing logic for the domain;
   obtaining a load metric for the target endpoint and a load metric for at least one other endpoint computing system of the multiple endpoint computing systems;
   determining whether the obtained load metric for the target endpoint satisfies a first overload condition;
   determining whether the obtained load metric for the at least one other endpoint computing system satisfies a second overload condition; and
   redirecting a fractional portion of traffic of the domain away from the target endpoint and to the at least one other endpoint computing system of the multiple endpoint computing systems in response to determining that the load metric for the target endpoint satisfies the overload condition and to determining that the at least one other endpoint computing system does not satisfy the second overload condition.

22. The one or more memory devices of claim 21, wherein the overload condition specifies and the fractional portion of traffic redirected away from the target endpoint is dependent upon an amount by which the obtained load metric exceeds a first overload threshold.

23. The one or more memory device of claim 21, wherein determining that the obtained load metric for the target endpoint satisfies an overload condition further comprises:
   calculating the fractional portion of the traffic to redirect away from the target endpoint based on the overload condition and the obtained load metric.

24. The one or more memory devices of claim 22, wherein the computer process further comprises:
   querying the target endpoint to request the load metric responsive to receipt of the DNS request; and
   receiving the load metric responsive to the request.

25. The one or more memory devices of claim 22, wherein the target endpoint is the endpoint computing system having a closest geographic proximity to an origin of the DNS request, one of the at least one other endpoint computing system has a next-closest geographic proximity to the origin of the DNS request, and further comprising:

identifying the one of the at least one other endpoint computing system from the pool of the multiple endpoint computing systems based on the routing logic for the domain.

* * * * *